United States Patent [19]

Anema et al.

[11] 4,291,066
[45] Sep. 22, 1981

[54] PROCESS FOR PRODUCING AN AMBIENT STABLE, STARCH-CONTAINING CONCENTRATE

[75] Inventors: Pieter J. Anema, Zevenaar, Netherlands; Derek R. Haisman, Bedford; Rose M. Adams, Wellingborough, both of England

[73] Assignee: Thomas J. Lipton, Inc., Englewood Cliffs, N.J.

[21] Appl. No.: 100,884

[22] Filed: Dec. 6, 1979

[30] Foreign Application Priority Data

Dec. 7, 1978 [GB] United Kingdom .............. 47554/78

[51] Int. Cl.³ .............................................. A23L 1/40
[52] U.S. Cl. .................................. 426/578; 426/589; 426/658; 426/661; 426/330; 426/331
[58] Field of Search .............. 426/589, 661, 330, 331, 426/578

[56] References Cited

U.S. PATENT DOCUMENTS

| | | | |
|---|---|---|---|
| 3,676,154 | 7/1972 | Glasser | 426/589 |
| 3,694,233 | 9/1972 | Kaplow et al. | 426/589 |
| 3,769,042 | 10/1973 | Kaplow et al. | 426/589 |
| 3,949,104 | 4/1976 | Cheng et al. | 426/589 |
| 4,140,809 | 2/1979 | Glasser et al. | 426/589 |

*Primary Examiner*—Jeanette M. Hunter
*Attorney, Agent, or Firm*—Brumbaugh, Graves, Donohue & Raymond

[57] ABSTRACT

A process for producing an aqueous concentrate which can be pasteurized and subsequently reconstituted into a lump-free, thick soup, sauce, gravy or dessert, which process involves producing a concentrate in which are incorporated:

(i) a proportion of starch sufficient to obtain a product of the desired degree of creaminess, (ii) a proportion of an appropriate osmotic-pressure increasing agent, sufficient to substantially reduce the rate of swelling of starch granules and prevent gelatinization of said starch during pasteurization, and (iii) a proportion of a water-activity depressing agent conducive to a water activity not exceeding 0.92.

8 Claims, No Drawings

PROCESS FOR PRODUCING AN AMBIENT STABLE, STARCH-CONTAINING CONCENTRATE

The invention relates to a process for producing ambient stable aqueous concentrates containing starch, which on dilution with water or an aqueous liquid reconstitute into a homogeneous, lump-free, thick soup, sauce, gravy, dessert or beverage.

More particularly the invention relates to a process for producing instant concentrates which on dilution with a liquid of a temperature from 65° to 100° C. form a lump-free product within 3 minutes and preferably within 1 minute.

By concentrate is meant throughout the specification a concentrated aqueous suspension of a starch and appropriate ingredients such as vegetable powders, skimmed milk powder, flavours, fat, sugars, and the like, which is sufficiently fluid to disperse easily on dilution and is easily spoonable during its transfer from a container into a bowl, cup or dish where it is diluted by the consumer to obtain the desired final product.

Moreover the concentrate will preferably have flow properties compatible with factory filling lines.

In order to meet the above requirements the concentrates produced according to the invention will have a moisture content preferably ranging from 10 to 40%.

By ambient stable concentrate is meant throughout the specification a concentrate which is microbiologically stable at room temperature, i.e. micro-organism growth must be inhibited or retarded in such a way that spoilage does not occur within a period of 2 years.

In order to meet these safety requirements it is almost a requisite to subject the concentrate to a heat treatment especially if the use of antimycotics is to be avoided.

When a concentrate containing starch is heat-processed, the starch gelatinises in the container. When the consumer transfers the contents of the container in e.g. a bowl, and dilutes it with hot water, it is extremely difficult to disperse the gelatinised mixture to get a homogeneous product having the desired viscosity.

The main object of the present invention is therefore to provide a process for producing a concentrate containing starch which when heat-processed will virtually not gelatinise and which on dilution with hot water will develop the desired viscosity.

Applicants have found that in order to satisfy these conditions the swelling of the starch must be minimized during the preparation and heat-processing of the concentrate but it should retain sufficient swelling potential during the dilution step.

Starch granules swell at their gelatinisation temperature owing to the osmotic gradient between the external environment and the interior of the starch granule. Applicants have found that lowering this gradient by increasing the osmotic pressure in the external environment (i.e. the aqueous liquid in which the starch is dispersed) will reduce the rate of swelling of the starch and will consequently raise the temperature at which gelatinisation of the starch starts. However on dilution with hot water the concentration of osmotic-pressure increasing agents will decrease and the starch will gelatinise at approximately its normal gelatinisation temperature.

Moreover Applicants have found that proportions of an appropriate osmoticpressure increasing agent in combination with a water-activity depressing substance effectively prevent gelatinisation of the starch under the heat-processing conditions and lower the water activity (which is a measure for the available proportion of water and is expressed as the ratio of the water pressure of the system to the water pressure of pure water at a particular temperature) to such an extent that a heat-treatment carried out at a temperature not exceeding 100° C. contributes to a great extent to ensuring the bacteriological safety of the system.

Accordingly the process according to the invention for producing an ambient stable concentrate, which on dilution reconstitutes into a lump-free thick soup, sauce, gravy, or dessert involves:

(a) producing a concentrate containing:
 (i) water,
 (ii) starch,
 (iii) a proportion of an appropriate osmotic-pressure increasing agent, sufficient to substantially reduce the rate of swelling of the starch and prevent gelatinisation of said starch at a temperature ranging from 60° to 100° C., and
 (iv) a proportion of a water-activity depressing agent conductive to a water activity not exceeding 0.92.

(b) pasteurising the concentrate at a temperature ranging from 60°–100° C.

Water-activity depressing substances are well-known in the art and may consist of a physiologically acceptable salt such as a sodium- or calcium halide, preferably sodium chloride, a humectant such as polyhydric alcohols, preferably glycerol, protein hydrolysates, lactose and/or glucose.

In the process according to the invention sodium-chloride is preferably used as the water-activity suppressing substance in a proportion which ranges from 0.1 to 7 wt.% based on the total composition of the concentrate.

The proportion of water-activity depressing agent is so chosen that in combination with the other ingredients present in the concentrate a water activity which preferably ranges from 0.77–0.90 is achieved. Useful osmotic-pressure increasing agents are preferably those which do not easily penetrate starch granules but remain in the liquid in which the starch is dispersed.

In the process according to the invention starch hydrolysates, particularly maltodextrins or glucose syrup solids having a DE-value ranging from 10–42, hydrolysed amylopectin and/or sucrose can be used.

Applicants have found that maltodextrin having a DE-value from 10–42 and sucrose were very effective in most product situations.

Adequate proportions of the osmotic-pressure increasing agent can be assessed in each particular case. In most instances the proportions of starch:osmotic-pressure increasing agent: water lies within the range of 1:1–2:0.5–6.

The starch incorporated in the concentrate according to the invention can be a native starch such as corn starch, potato starch, tapioca starch and the like and/or a modified starch such as starch phosphates and acetylated starch phosphates EEC Nos. 1410–1414, acetylated distarch adipate EEC No. 1422, hydroxy propylated distarch glycerol EEC No. 1441 or hydroxypropylated distarch phosphate EEC No. 1442.

The appropriate proportion of starch to be used will depend on the required degree of dilution which is to be carried out by the consumer before consumption; it will also depend on the flow properties required by the factory filling lines and of course of the thickening potential of the starch.

In most instances a proportion of 10-30% starch in the concentrate will be adequate.

The pasteurisation step according to step (b) of the process according to the invention is carried out in containers at a temperature ranging from 60°-100° C., and preferably 70°-90° C. for a period which may vary from 1-60 minutes.

The sealed containers are subsequently stored at room temperature until consumption.

Before consumption the concentrates are diluted with an appropriate proportion of hot, preferably boiling water or an aqueous solution to obtain after stirring for a few seconds the desired thick product. It is of course possible to boil the diluted solution for a few minutes before consumption.

The invention will now be illustrated in the following Examples.

EXAMPLE 1

A mushroom soup concentrate was prepared by mixing the following proportions of ingredients:

|  | % |
| --- | --- |
| Tapioca starch | 17.8 |
| Maltodextrin (DE = 10) | 23.6 |
| Fat | 13.5 |
| Skimmed milk powder (containing ± 50% lactose) | 3.8 |
| Coffee whitener | 6.3 |
| Salt | 4.8 |
| Flavouring and spices | 1.7 |
| Dried mushroom | 0.2 |
| Onion powder | 0.3 |
| Mushroom powder | 2.5 |
| Water | up to 100% |

The water activity $a_w$ was 0.83.

The soup concentrate was filled into containers and pasteurized at 80° C. for a period of 40 minutes. In the soup concentrate the starch was predominantly in the ungelatinised form.

Reconstitution into a soup was achieved by diluting 41 g. of concentrate with 200 ml of boiling water in a bowl and by gently stirring for 30-60 seconds.

A creamy, lump-free mushroom soup was obtained having a viscosity of approximately 200 cP at a shear rate of 50 sec.$^{-1}$.

After a storage period of 6 months at ambient temperature the concentrate did not display any sign of spoilage.

EXAMPLE 2

A tomato soup concentrate was prepared by mixing the following proportions of ingredients:

|  | % |
| --- | --- |
| Acetylated distarch adipate (EEC No 1422) | 10.1 |
| Amioca starch | 7.0 |
| Fat | 16.5 |
| Salt | 2.6 |
| Maltodextrin (DE = 10) | 18.0 |
| Coffee whitener | 7.0 |
| Sucrose | 3.0 |
| Spice mix | 5.0 |
| Tomato powder | 8.4 |
| Water | up to 100%. |

The water activity $a_w$ was 0.81.

The soup concentrate was filled into containers and pasteurized at 75° C. for a period of about 60 minutes. The starch was predominantly in the ungelatinised state.

After a storage period of 6 months at ambient temperature the concentrate did not display any sign of spoilage.

Reconstitution into a soup was achieved by diluting 42 g of the concentrate with 200 ml of boiling water in a bowl and by gently stirring for 20-60 seconds. A creamy, lump-free tomato soup was obtained having a viscosity of approximately 180 cP at a shear rate of 50 sec.$^{-1}$.

EXAMPLE 3

A bearnaise sauce concentrate was prepared by mixing the following proportions of ingredients:

|  | % |
| --- | --- |
| Corn-flour | 22.0 |
| Maltodextrin (DE = 29) | 19.5 |
| Flavour mix | 6.1 |
| Salt | 3.2 |
| Coffee whitener | 14.7 |
| Fat | 9.8 |
| Tarragon flake | 0.2 |
| Acetic acid (glacial) | 0.24 |
| Vinegar | 14.6 |
| Water | up to 100%. |

The water-activity of the concentrate was 0.85.

The sauce concentrate was filled into containers and pasteurized at 80° C. for a period of 30 minutes. In the concentrate the starch was predominantly in the ungelatinised state.

After a storage period of 6 minutes at ambient temperature the concentrate did not display any sign of spoilage.

Reconstitution into a thick, lump-free sauce was achieved by diluting 41 g of concentrate with 200 ml of water and by boiling the dispersion for a few minutes.

EXAMPLE 4

A custard sauce concentrate was prepared by mixing the following proportions of ingredients:

|  | % |
| --- | --- |
| Amioca starch | 3 |
| Acylated distarch adipate | 25 |
| Coffee whitener | 15.5 |
| Fat | 1.5 |
| Sugar | 35 |
| Salt | 0.2 |
| Flavours | 0.1 |
| Water | up to 100%. |

The water activity of the concentrate was 0.85. The custard sauce concentrate was filled into a container and pasteurised at 80° C. for a period of 30 minutes. In the concentrate the starch was predominantly in the ungelatinised form.

After a storage period of 6 months at ambient temperature the concentrate did not display any sign of spoilage.

Reconstitution into a thick, lump-free sauce was achieved by diluting about 40 g of concentrate with 200 ml of boiling water, and stirring for a few seconds.

We claim:

1. A process for producing an ambient stable concentrate which on dilution with water or an aqueous liquid forms at a temperature from 65° to 100° C. into a lump-free, thick soup, sauce, gravy or dessert, which process comprises:

(1) producing a concentrate containing:
  (a) water
  (b) starch,
  (c) a proportion of an appropriate osmotic-pressure increasing agent sufficient to substantially reduce the rate of swelling of the starch and prevent gelatinisation during a pasteurization treatment carried out at 60°–100° C., and
  (d) a proportion of a water-activity depressing agent conducive to a water activity not exceeding 0.92,
(2) filling the concentrate into containers and sealing the containers, and
(3) pasteurizing the concentrate in the sealed containers at 60° to 100° C.

2. A process according to claim 1, in which the osmotic-pressure increasing agent consists of a substance which does not penetrate starch granules.

3. A process according to claim 2, in which the osmotic-pressure increasing agent is selected from the group consisting of glucose syrup solids, maltodextrins having a DE-value ranging from 10–42, hydrolysed amylopectin and sucrose.

4. A process according to claim 1, in which the water-activity depressing agent is selected from the group consisting of physiologically acceptable salts, polyhydric alcohols, protein hydrolysates, lactose and glucose.

5. A process according to claim 1, in which the water activity of the composition is adjusted to a value ranging from 0.77 to 0.90.

6. A process according to claim 1, in which the concentrate contains 10 to 30 wt.% starch and has a moisture content ranging from 10 to 40 wt.%.

7. A process according to claim 1, wherein a concentrate is produced in which the proportions of starch:osmotic-pressure increasing agent:water correspond to 1:1–2:0.5–6.

8. A process according to claim 1, in which
  (a) a concentrate is produced which contains starch, a maltodextrin having a DE-value from 10–42 and water in proportions corresponding to 1:1–2:0.5–6,
  (b) the water activity of the concentrate is adjusted to a value not exceeding 0.92 by adding 0.1 to 7 wt.% of sodium chloride, and
  (c) the concentrate thus obtained is pasteurized at 60°–100° C.

* * * * *